(12) United States Patent
Oshiyama et al.

(10) Patent No.: US 9,870,170 B2
(45) Date of Patent: Jan. 16, 2018

(54) MEMORY CONTROLLER, MEMORY SYSTEM AND MEMORY CONTROL METHOD

(71) Applicant: Toshiba Memory Corporation, Minato-ku (JP)

(72) Inventors: Naoto Oshiyama, Ota (JP); Ikuo Magaki, Yokohama (JP); Satoshi Kaburaki, Meguro (JP); Takashi Ogasawara, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 55 days.

(21) Appl. No.: 15/054,333

(22) Filed: Feb. 26, 2016

(65) Prior Publication Data

US 2017/0075623 A1    Mar. 16, 2017

Related U.S. Application Data

(60) Provisional application No. 62/216,803, filed on Sep. 10, 2015.

(51) Int. Cl.
*G06F 3/06* (2006.01)
*G06F 12/1009* (2016.01)

(52) U.S. Cl.
CPC .......... *G06F 3/0647* (2013.01); *G06F 3/0619* (2013.01); *G06F 3/0685* (2013.01); *G06F 12/1009* (2013.01); *G06F 2212/1032* (2013.01)

(58) Field of Classification Search
None
See application file for complete search history.

(56) References Cited

U.S. PATENT DOCUMENTS

| | | | |
|---|---|---|---|
| 7,802,072 B2 | 9/2010 | Takemura | |
| 8,117,406 B2 | 2/2012 | Whang et al. | |
| 8,352,706 B2 | 1/2013 | Yano et al. | |
| 2004/0246841 A1* | 12/2004 | Miyamoto | G11B 20/10 369/47.28 |
| 2013/0227246 A1* | 8/2013 | Hirao | G06F 12/0246 711/206 |

FOREIGN PATENT DOCUMENTS

| | | |
|---|---|---|
| JP | 2008-40594 | 2/2008 |
| JP | 2010-157141 | 7/2010 |
| JP | 2010-218529 | 9/2010 |

* cited by examiner

*Primary Examiner* — Kevin Verbrugge
(74) *Attorney, Agent, or Firm* — Oblon, McClelland, Maier & Neustadt, L.L.P.

(57) ABSTRACT

According to one embodiment, a memory controller includes a first volatile memory, a second volatile memory, and a controller. The first volatile memory temporarily stores therein data acquired from outside. The controller controls the temporarily stored data to be transferred from the first volatile memory to a non-volatile memory, stores correspondence information of the transferred data to the non-volatile memory in the second volatile memory, and updates correspondence information stored in the non-volatile memory based on the correspondence information stored in the second volatile memory by using the first volatile memory after the data transfer as a work area. The correspondence information represents association between a logical address and a physical address of the data.

12 Claims, 6 Drawing Sheets

MEMORY CONTROLLER, MEMORY SYSTEM AND MEMORY CONTROL METHOD

CROSS-REFERENCE TO RELATED APPLICATION

This application claims the benefit of U.S. Provisional Patent Application No. 62/216,803, filed Sep. 10, 2015, the entire contents of which are incorporated herein by reference.

FIELD

Embodiments described herein relate generally to a memory controller, a memory system, and a memory control method.

BACKGROUND

A memory system including a non-volatile memory is known. This memory system temporarily stores data acquired from a host such as a personal computer in an internal memory and then stores the data in the non-volatile memory. To allow the host to access the data stored in the non-volatile memory, the memory system also manages a table that associates a logical address and a physical address of the data with each other in the non-volatile memory.

However, the conventional memory system needs to include various internal memories in order to store data in the non-volatile memory and update the table.

DETAILED DESCRIPTION

In general, according to one embodiment, a memory controller comprises a first volatile memory, a second volatile memory, and a controller. The first volatile memory temporarily stores therein data acquired from outside. The controller controls the temporarily stored data to be transferred from the first volatile memory to a non-volatile memory, stores correspondence information of the transferred data to the non-volatile memory in the second volatile memory, and updates correspondence information stored in the non-volatile memory based on the correspondence information stored in the second volatile memory by using the first volatile memory after the data transfer as a work area. The correspondence information represents association between a logical address and a physical address of the data.

Exemplary embodiments of a memory controller, a memory system, and a memory control method will be explained below in detail with reference to the accompanying drawings. The present invention should not be limited to the following embodiments.

First Embodiment

Figure 1:
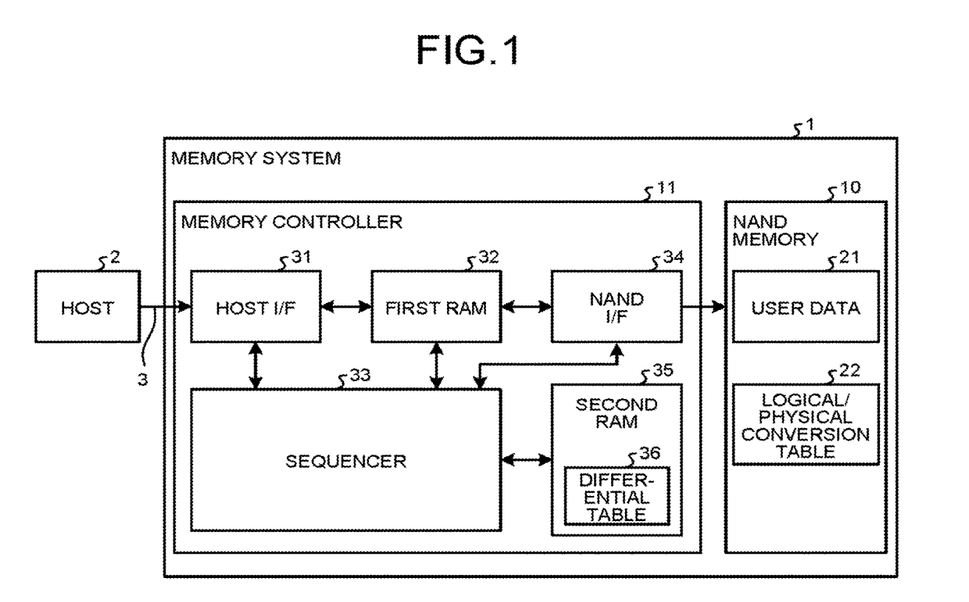
FIG. 1 is a diagram illustrating a configuration example of a memory system according to a first embodiment.

FIG. 1 is a diagram illustrating a configuration example of a memory system according to a first embodiment. As illustrated in FIG. 1, a memory system 1 is connected to a host 2 via a communication channel 3. Although not limited thereto, the host 2 can be, for example, a personal computer, a server computer, or a CPU (Central Processing Unit). An MPHY or a UniPro defined by an MIPI (Mobile Industry Processor Interface) as a communication standard can be used for the communication channel 3, for example.

The memory system 1 can be, for example, an SSD (Solid State Drive) or an embedded flash memory in compliance with a UFS (Universal Flash Storage) standard. The memory system 1 includes a NAND flash memory (NAND memory) 10 and a memory controller 11 that performs data transfer between the host 2 and the NAND memory 10. The memory system 1 can include any non-volatile memory instead of the NAND memory 10. For example, the memory system 1 can include a NOR flash memory instead of the NAND memory 10. One or more NAND memories 10 can be connected to the memory controller 11.

The NAND memory 10 includes one or more memory chips each having a memory cell array. The memory cell array has a plurality of memory cells in matrix. Each block of the memory cell array has a plurality of pages. Each page is a unit of data read or data write, for example.

The NAND memory 10 stores therein user data 21 and a logical/physical conversion table 22. The user data 21 includes, for example, an operating system program (hereinafter, "OS") having an execution environment provided by the host 2, a user program executed by the host 2 on the OS, and data input or output by the OS or the user program.

The logical/physical conversion table 22 is used to enable the memory system 1 to function as an external storage device of the host 2. The logical/physical conversion table 22 is a table that contains address correspondence information on a logical block address (LBA) and a physical block address (PBA) on the NAND memory 10 associated with each other. The logical block address is used by the host 2 to access the user data 21 in the memory system 1.

The memory controller 11 includes a host I/F a first RAM (Random Access Memory) 32, a sequencer 33, a NAND I/F 34, and a second RAM 35. The host I/F 31 is a connection interface to the host 2. The first RAM 32 is a volatile memory that temporarily stores therein data acquired from the host 2. In the first embodiment, the first RAM 32 is an area in which data is temporarily stored and is also a common area used as a work area for updating the logical/physical conversion table 22.

The sequencer 33 controls data transfer between the host 2 and the first RAM 32 via the host I/F 31. The sequencer 33 controls data transfer between the first RAM 32 and the NAND memory 10 via the NAND I/F 34. The sequencer 33 acquires data from the host 2, temporarily stores the data in the first RAM 32, and writes the data to the one or more connected NAND memories 10. For example, with use of two or more NAND memories 10, the sequencer 33 controls data to be written to the NAND memories 10 in parallel, thereby realizing efficient non-volatilization. The sequencer 33 is an example of a controller.

In the first embodiment, when receiving data from the host 2, the sequencer 33 uses the first RAM 32 as a write buffer to temporarily store the data from the host 2 in the first RAM 32. The sequencer 33 controls the data stored in the first RAM 32 to be transferred as the user data 21 to the NAND memory 10 and controls address correspondence information of the transferred data in the second RAM 35. The sequencer 33 updates the logical/physical conversion table 22 stored in the NAND memory 10 based on the address correspondence information of the transferred data stored in the second RAM 35, using the first RAM 32 after the data transfer as a work area.

Here, the sequencer 33 does not acquire data from the host 2 while updating the logical/physical conversion table 22 stored in the NAND memory 10 using the first RAM 32 as a work area. Thus, the sequencer 33 uses the first RAM 32 as a common area to be a write buffer in which data is temporarily stored or a work area in which the logical/physical conversion table 22 is updated.

Conventionally, to realize data transfer from the host 2, it is necessary for the memory controller include a write buffer in which data transmitted the host 2 is temporarily stored, a memory in which address correspondence information of the temporarily stored data in the write buffer is temporarily stored for transferring the data to the NAND memory 10 for storage, and a memory used for a work area to reflect the address correspondence information stored in the memory in the logical/physical conversion table of the NAND memory 10. Including different kinds of memories results in increasing costs, power consumption and the like.

In the first embodiment, the sequencer 33 uses the first RAM 32 as a common area to be the write buffer and the work area as described above. This makes it possible to reduce the number of memories to one from two as conventionally required, leading to reducing the cost and the power consumption.

The NAND I/F 31 is a connection interface for the memory controller 11 and the NAND memory 10.

The second RAM 35 is a volatile memory that stores therein a differential table 36 created from the correspondence information between the logical address and the physical address of data acquired by the sequencer 33 from the host 2 when the data is transferred from the first RAM 32 to the NAND memory 10 for storage. The differential table 36 includes differential information relative to the logical/physical conversion table 22 stored in the NAND memory 10 and is used to update the logical/physical conversion table 22.

The first RAM 32 and the second RAM 35 each include an SRAM (Static Random Access Memory), a DRAM (Dynamic Random Access Memory), or the like.

(Data Storing in NAND Memory)

Figure 2:
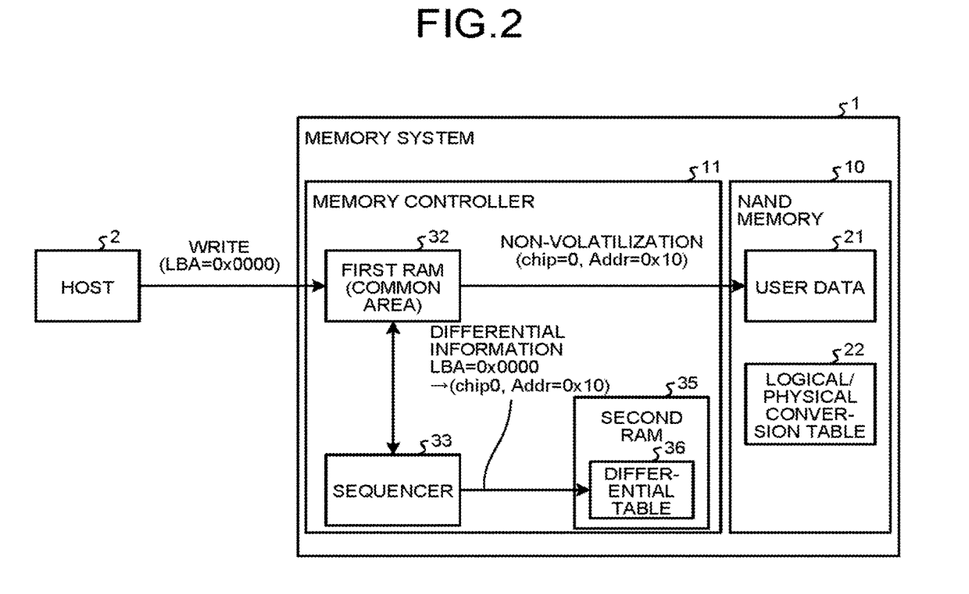
FIG. 2 is a diagram illustrating a data storing process in a NAND memory according to the first embodiment.

FIG. 2 is a diagram illustrating a process by the sequencer to store data in the NAND memory. As illustrated in FIG. 2, the first RAM 32 is used by the sequencer 33 as a write butter in which write data ("WRITE" in FIG. 2, for example) acquired from the host 2 is temporarily stored.

The sequencer 33 controls the temporarily stored write data in the first RAM 32 to be transferred as the user data 21 to the NAND memory 10. Then, the sequencer 33 stores the user data 21 at a physical address ("chip=0, Addr=0x10" in FIG. 2, for example) on the NAND memory 10 for non-volatilization.

The sequencer 33 creates the differential table 36 based on the address correspondence information between a logical address ("LBA=0x0000" in FIG. 2) of the write data specified by the host 2 and the physical address ("PBA: chip=0, Addr=0x10" in FIG. 2) on the NAND memory 10. The differential table 36 ("LBA=0x0000"→"chip=0, Addr=0x10" in FIG. 2) is differential information relative to the logical/physical conversion table 22 stored in the NAND memory 10.

(Update of Logical/Physical Conversion Table)

Figure 3:
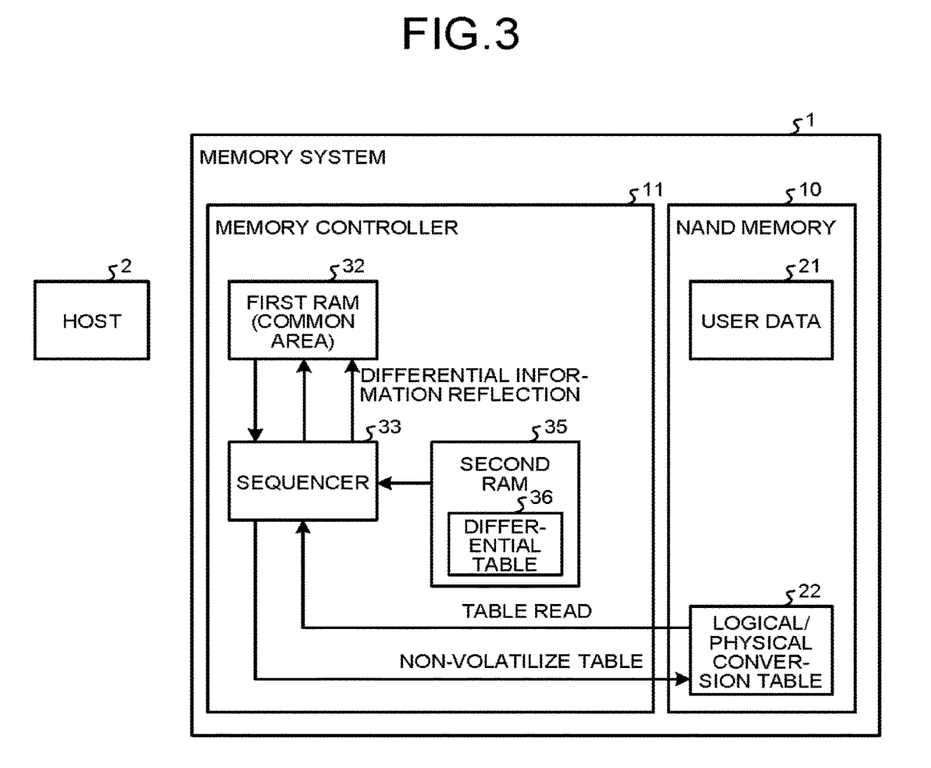
FIG. 3 is a diagram illustrating updating of a logical/physical conversion table according to the first embodiment.

FIG. 3 is a diagram illustrating a process of the sequencer's updating the logical/physical conversion table. In FIG. 3, for instance, upon determining that a certain amount (a particular threshold or more, for example) of differential information is stored in the differential table 36 in the second RAM 35 while the first RAM 32 is not used as a write buffer, the sequencer 3 reads the logical/physical conversion table 22 using the first RAM 32 as a work area. The sequencer reflects the differential table 36 in the read logical/physical conversion table 22, thereby updating the logical/physical conversion table 22. Thereby, the pre-update or post-update logical/physical conversion table 22 is stored at a position of the first RAM 32 overlapping with the position where write data is temporarily stored at the time of previous writing.

The sequencer 33 stores the latest updated logical/physical conversion table 22 in the NAND memory 10 for non-volatilization. Accordingly, in response to a data transfer request from the host 2, the sequencer 33 can appropriately read target data from the user data 21 stored in the NAND memory 10, using the logical/physical conversion table 22.

The sufficient capacity of the first RAM 32 is 256 KiB or 512 KiB as a double buffer since data transfer of 32 KiB×8=256 KiB in a lump is efficient when the NAND memory 10 performs data transfer at 2 planes, 3 KiB, and 8-way interleaving. In the first embodiment, the sequencer 33 thus uses the first RAM 32 as a common area, thereby reducing two memories, i.e., the conventional write buffer and the memory for a work area, to one memory.

Sequence in First Embodiment

Figure 4:
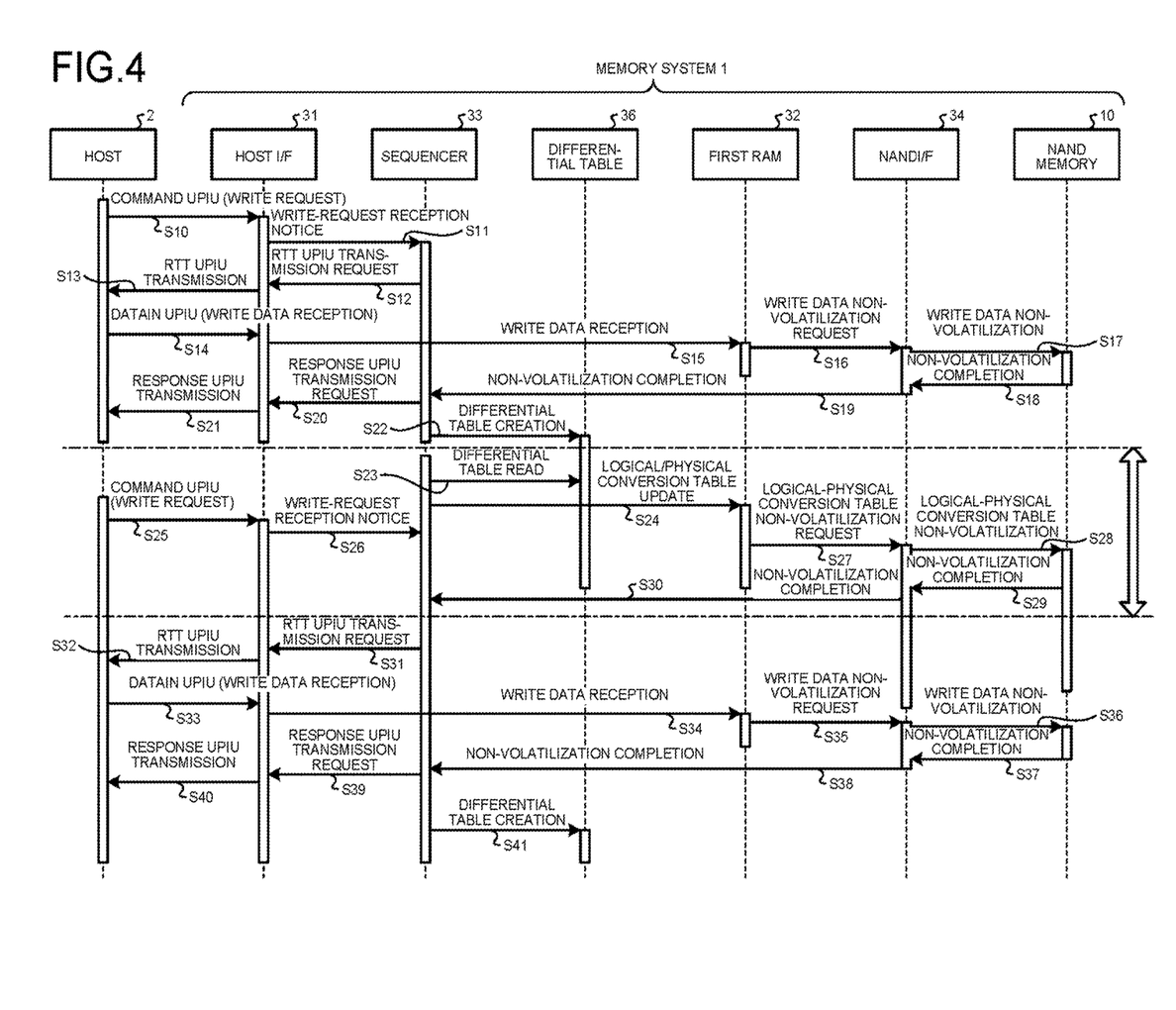
FIG. 4 illustrates a sequence when a host I/F is a UFS I/F connected to a host according to the first embodiment.

FIG. 4 illustrates a sequence in the first embodiment in a case where the host I/F is a UFS I/F connected to a host, for example. The sequence in FIG. 4 is performed by the host 2, and the host I/F 31, the sequencer 33, the differential table 36, the first RAM 32, the NAND I/F 34, and the NAND memory 10 of the memory system 1.

In FIG. 4, upon receipt of a write request (COMMAND UPIU) for writing write data from the host 2 (S10), the host I/F 31 of the memory system 1 issues a write-request reception notice to the sequencer 33 (S11). Responding to the write-request reception notice, the sequencer 33 submits a write data transmission request (RTT UPIU) to the host I/F 31 (S12). The host I/F 31 transmits the write data transmission request to the host 2 (S13).

Upon reception of the write data (DATAIN UPIU) from the host 2 (S14), the host I/F 31 transmits the write data to the first RAM 32 and uses the first RAM 32 as a write buffer to temporarily store the write data therein (S15). The first RAM 32 has stored the write data and submits a write data non-volatilization request to the NAND I/F 34 (S16). The NAND memory 10 receives the write data non-volatilization request via the NAND I/F 34 (S17).

After completion of non-volatilization of the write data, the NAND memory 10 issues a non-volatilization completion notice to the NAND I/F 34 (S18). The sequencer 33 receives the write data non-volatilization completion notice from the NAND I/F 34 (S19).

Upon reception of the write data non-volatilization completion notice, the sequencer 33 requests the host I/F 31 to transmit a write data reception notice (RESPONSE UPIU) (S20). The host I/F 31 transmits the write data reception notice to the host). The sequencer 33 creates the differential table 36 from address correspondence information between a logical address specified by the host 2 and a physical address on the NAND memory 10 to store the write data received in S14 (S22).

Next, the sequencer 33 reads the differential table 36 (S23) and reflects contents the differential table 36 in the logical/physical conversion table 22 to update the logical/physical conversion table 22 while using the first RAM 32 as a work area (S24).

Upon receiving a write request from the host (S25), the host I/F 31 issues a write-request reception notice to the sequencer 33 (S26). However, the sequencer 33 does not respond to the write request but stands by because the sequencer 33 is reflecting(updating) the contents of the differential table 36 in the logical/physical conversion table 22 using the first RAM 32.

After the update of the logical/physical conversion table 22, the first RAM 32 requests the NAND I/F 34 to non-volatilize the logical/physical conversion table (S27). The NAND memory 10 receives the request for non-volatilization of the logical/physical conversion table 22 from the NAND I/F 34 (S28).

Upon completion of non-volatilization of the logical/physical conversion table 22, the NAND memory 10 issues a non-volatilization completion notice of the logical/physical conversion table 22 to the NAND I/F 34 (S29). The sequencer 33 receives the non-volatilization completion notice from the NAND I/F 34 (S30).

Upon reception of the non-volatilization completion notice of the logical/physical conversion table 22, the sequencer 33 requests the host I/F 31 to transmit write data in order to respond to the write-request reception notice received in S26 (S31). The host I/F 31 transmits a write data transmission request to the host 2 (S32). Because the process in S33 to S41 in FIG. 4 is identical to that in S14 to S22, detailed descriptions thereof will be omitted.

As described above, in the first embodiment, the sequencer 33 reflects the contents of the differential table 36 in the logical/physical conversion table 22 using the first RAM 32 as a work area during the process in S23, S24 and S27 to S30 in FIG. 4. Therefore even having received a write-request reception notice from the host 2, the sequencer 33 does not submit a write data transmission request to the host 2 in order not to receive write data from the host 2. According to the first embodiment, the first RAM 32 is used as a common area for the write buffer and the work area. This enables reduction of the number of memories to one memory from conventional two, thereby achieving cost reduction and power consumption reduction.

Although a use of UPS I/F as the host I/F 31 has been described referring to FIG. 4 by way of example, the first embodiment should not be limited thereto. A use of an NVMe (Non-Volatile Memory Express) for the host I/F 31 is described next.

Figure 5:
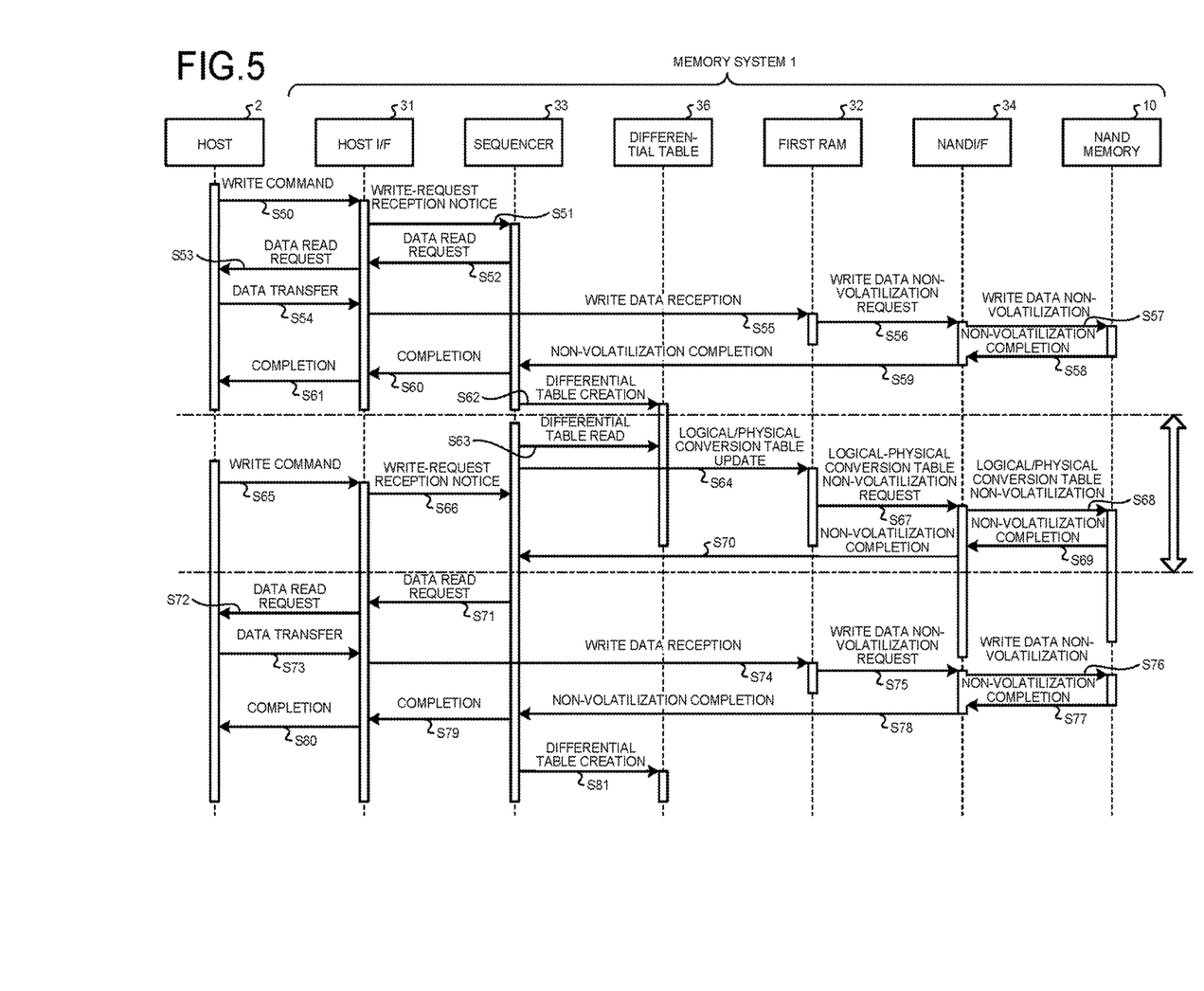
FIG. 5 illustrates a sequence when the host I/F is an NVMe connected to the host according to the first embodiment.

FIG. 5 illustrates a sequence in the first embodiment when the host I/F is an NVMe connected to a host. The sequence in FIG. 5 is performed by the host 2, and the host I/F 31, the sequencer 33, the differential table 36, the first RAM 32, the NAND I/F 34, and the NAND memory 10 of the memory system 1 similar to the sequence in FIG. 4.

In FIG. 5, when receiving a write request (Write Command) for writing write data from the host 2 (S50), the host I/F 31 of the memory system 1 issues a write-request reception notice to the sequencer 33 (S51). The sequencer 33 submits a write data read request to the host I/F 31 in response to the write-request reception notice (S52). The host I/F 31 submits the write data read request to the host 2 (S53).

When receiving the write data from the host 2 (S54), the host I/F 31 transmits the write data to the first RAM 32 and uses the first RAM 32 as a write buffer to temporarily store therein the write data (S55). The first RAM 32 has temporarily stored write data and requests that the NAND I/F 34 non-volatilizes the write data (S56). The NAND memory 10 receives a write data non-volatilization request via the NAND I/F 34 (S57).

Upon completing non-volatilization of the write data, the NAND memory 10 issues a non-volatilization completion notice to the NAND I/F 34 (S58). The sequencer 33 receives the write data non-volatilization completion notice from the NAND I/F 34 (S59).

Upon receiving the write data non-volatilization completion notice, the sequencer 33 submits a request for transmission of a write data reception (Completion) notice to the host I/F 31 (S60). The host I/F 31 transmits the write data reception notice to the host 2 (S61). The sequencer 33 creates the differential table 36 based on the address correspondence information of the write data received in S54 (S62).

Next, the sequencer 33 reads the differential table 36 (S63) and uses the first RAM 32 as a work area to reflect the contents of the differential table 36 in the logical physical conversion table 22 to update the logical/physical conversion table 22 (S64).

When receiving a write request from the host 2 (S65), the host I/F 31 issues a write-request reception notice to the sequencer 33 (S66). However, the sequencer 33 does not respond to the write request but stands by since the sequencer 33 is reflecting the contents of the differential table 36 in the logical/physical conversion table 22. Because the process in S67 to S70 in FIG. 5 is identical to that in S27 to S30 in FIG. 4, detailed descriptions thereof will be omitted.

Upon receiving the non-volatilization completion notice of the logical/physical conversion table 22 in S70, the sequencer 33 submits a write data read request to the host I/F 31 to respond to the write-request reception notice received in S66 (S71). The host I/F 31 submits the write data read request to the host 2 (S72). Because the process in S73 to S81 in FIG. 5 is identical to that in S54 to S62, detailed descriptions thereof will be omitted.

As described above, the sequencer 33 reflects the contents of the differential table 36 in the logical/physical conversion table 22 using the first RAM 32 as a work area during the process in S63, S64 and S67 to S70 in FIG. 5. Therefore, even having received a write-request reception notice from the host 2, the sequencer 33 does not receive the write data from the host 2 by not requesting the host 2 to read the write data.

According to the first embodiment, the sequencer 33 uses the first RAM 32 as a common area to be a write buffer for temporary data storage or as a work area for the update of the logical/physical conversion table 22. Thus, the number of memories can be reduced to one from two as conventionally required, realizing the cost reduction and the power consumption reduction accordingly.

Second Embodiment

A second embodiment is described next. The second embodiment is different from the first embodiment in that a dedicated area for the write buffer is provided in the first RAM 32 in addition to the afore-mentioned common area.

Figure 6:
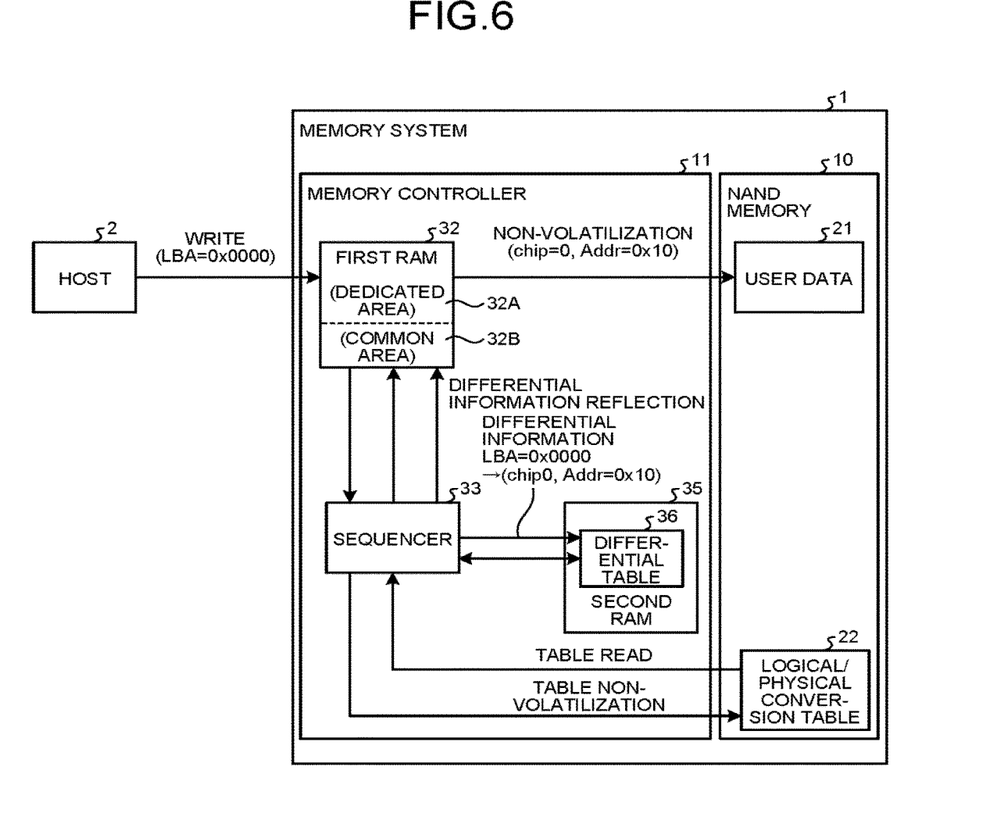
FIG. 6 is a diagram illustrating a process according to a second embodiment.

FIG. 6 is a diagram illustrating a process according to the second embodiment. As illustrated in FIG. 6, the first RAM 32 includes a dedicated area 32A used to temporarily store write data therein and a common area used to temporarily store write data or update the logical/physical conversion table 22 therein.

The sequencer 33 acquires write data from the host 2, temporarily stores the write data in the dedicated area 32A of the first RAM 32, and stores the write data in the NAND memory 10 for non-volatilization. The sequencer 33 uses the common area 32B of the first RAM 32 as a work area to update the logical/physical conversion table 22 for non-volatilization. Thereby, the sequencer 33 can control the update of the logical/physical conversion table 22 and the temporary storage of write data in parallel by using the common area 32B of the first RAM 32 as a work area while the write data from the host 2 is being temporarily stored in the dedicated area 32A of the first RAM 32.

The first RAM 32 can be used as a double buffer having the capacity of 512 KiB when the NAND memory 10 performs data transfer at 2 planes, 32 KiB, and 8-way interleaving. In this case, a half of the capacity, 256 KiB can be allocated to the dedicated area 32A to store therein data from the host 2 and the other half, 256 KiB can be allocated to the common area 32B to be used for newly storing data from the host 2 or updating the logical/physical conversion table 22.

It is preferable to secure 256 KiB or 512 KiB of the capacity of the dedicated area 32A of the first RAM 32 by the above calculation in view of the data storing speed. However, if the data storing speed during the update of the logical/physical conversion table 22 in the common area 32B as a work area is less significant, the memory capacity of the dedicated area 32A can be reduced to 32 KiB equal to 2 planes as a writing unit of the NAND memory 10 or an integral multiple of the 2 planes (64 KiB or 128 KiB, for example). Although high-efficiency data write using the above 8-way interleaving is not feasible, data in units of 2 planes to the NAND memory 10 is possible so that data storing is feasible during the update of the logical/physical conversion table 22.

As described above, owing to the first RAM including the dedicated area 32A and the common area 32B, the logical/physical conversion table 22 can be updated in the common area 32B while write data from the host 2 is being stored in the dedicated area 32A. This accordingly makes it possible to reduce the length of a period in which a write data write request from the host 2 cannot be dealt with due to the update of the logical/physical conversion table 22 in the first RAM 32 as a work area, and to enhance responsivity to the host 2.

Sequence in Second Embodiment

Figure 7:
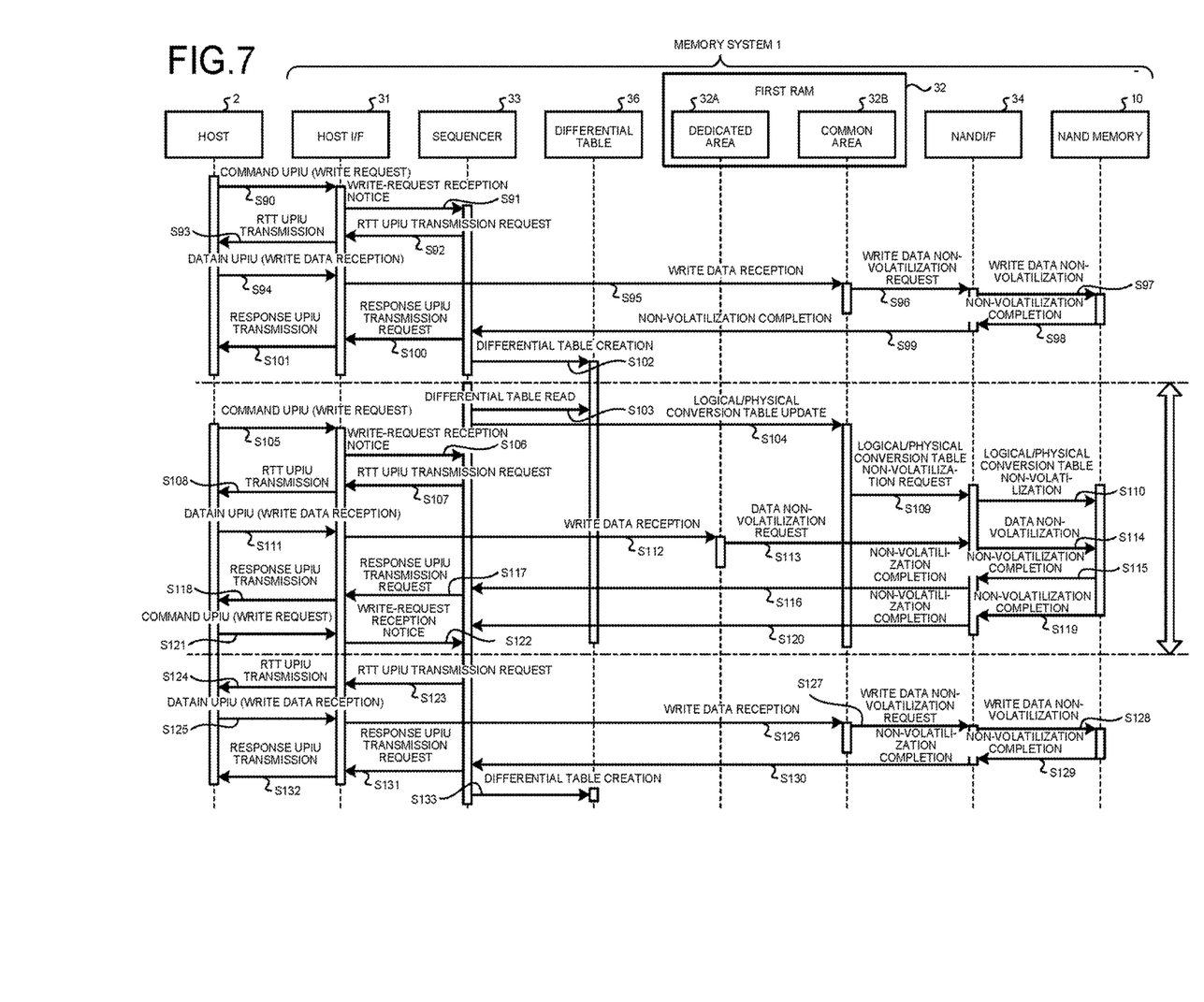
FIG. 7 illustrates a sequence according to the second embodiment.

FIG. 7 illustrates a sequence in the second embodiment. The sequence in FIG. 7 is performed by the host 2, and the host I/F 31, the sequencer 33, the differential table 36, the dedicated area 32A of the first RAM 32, the common area 32B of the first RAM 32, the NAND I/F 34, and the ANT memory 10 of the memory system 1. An example of FIG. 7 illustrates the use of a UFS as the host I/F, for example.

In FIG. 7, when receiving a write request from the host (S90), the host I/F 31 of the memory system 1 issues a write-request reception notice to the sequencer 33 (S91). The sequencer 33 submits a write data transmission request to the host I/F 31 in response to the write-request reception notice (S92). The host I/F 31 transmits the write data transmission request to the host 2 (S93).

Upon reception of the write data from the host 2 (S94), the host I/F 31 selects either the dedicated area 32A or the common area 32B of the first RAM 32 as a write buffer and temporarily stores the write data in the selected dedicated area 32A or common area 32B. In FIG. 7 the host I/F 31 transmits the write data to the common area 32B of the first RAM 32 (S95), for example.

Selection of the dedicated area 32A or the common area 32B as a write buffer in S95 can be determined according to availability of both of the areas, for example. In this case, the sequencer 33 can be configured to determine availability of the dedicated area 32A and the common area 32B at a timing at which it receives the write data from the host I/F 31 and transmit the write data to an available area. How to determine the availability should not be limited to the one described above. The sequencer 33 can be configured to, for example, transmit the write data to the dedicated area 32A and the common area 32B alternately.

Upon storing the write data, the common area 32B of the first RAM 32 submits a write data non-volatilization request to the NAND I/F 34 (S96). The NAND memory 10 receives the write data non-volatilization request via the NAND I/F 34 (S97), completes non-volatilization of the write data, and then issues a non-volatilization completion notice to the NAND I/F 34 (S98). The sequencer 33 receives the write data non-volatilization completion notice from the NAND I/F 34 (S99).

Upon receiving the write data non-volatilization completion notice, the sequencer 33 submits a request for transmission of a write data reception notice (RESPONSE UPIU) to the host I/F 31 (S100). The host I/F 31 transmits the write data reception notice to the host 2 (S101). The sequencer 33 creates the differential table 36 based on address correspondence information of the write data received in S94 (S102).

Next, the sequencer 33 reads the differential table 36 (S103), and uses the common area 32B of the first RAM 32 as a work area to reflect the contents of the differential table 36 in the logical/physical conversion table 22 and update the logical/physical conversion table 22 (S104).

When receiving a write request a received from the host 2 (S105), the host I/F 31 issues a write-request reception notice to the sequencer 33 (S106). The sequencer 33 determines that the common area 32B of the first RAM 32 is being used as a work area in S104 but the dedicated area 32A of the first RAM 32 is available and then submits a write data transmission request to the host I/F 31 in response to the write-request reception notice (S107). The host I/F 31 transmits the write data transmission request to the host 2 (S108).

The common area 32B of the first AM 32 requests the NAND I/F 34 to non-volatilize the logical/physical conversion table 22 (S109). The NAND memory 10 receives a non-volatilization request for the logical/physical conversion table 22 from the NAND I/F 34 (S110).

Upon receiving the write data from the host (S111), the host I/F 31 transmits the write data to the dedicated area 32A of the first RAM 32 (S112). Upon storing write data, the dedicated area 32A of the first RAM 32 submits a write data non-volatilization request to the NAND I/F 34 (S113). The NAND memory 10 receives the write data non-volatilization request via the NAND I/F 34 (S114). With an available memory space, the NAND memory 10 can non-volatilize the write data in parallel with the non-volatilization of the logical/physical conversion table 22 in response to the non-volatilization request received in S110.

Upon completing the non-volatilization of the write data, the NAND memory 10 issues a non-volatilization completion notice to the NAND I/F 34 (S115). The sequencer 33 receives the write data non-volatilization completion notice from the NAND I/F 34 (S116) and then submits a request for transmission of a write data reception notice to the host I/F 31 (S117). The host I/F 31 transmits the write data reception notice to the host 2 (S118).

Upon completing the non-volatilization of the logical/physical conversion table 22, the NAND memory 10 issues a non-volatilization completion notice of the logical/physical conversion table 22 to the NAND I/F 34 (S119). The sequencer 33 receives non-volatilization completion notice from the NAND I/F 34 (S120). Because the process in S121 to S133 in FIG. 7 is identical to that in S90 to S102, detailed descriptions thereof will be omitted.

In the second embodiment, the first RAM 32 includes the dedicated area 32A and the common area 32B. Therefore, while updating the logical/physical conversion table 22 in the common area 32B of the first RAM 32 as a work area, the sequencer 33 controls write data from the host 2 to be stored in the dedicated area 32A of the first RAM 32. This configuration can reduce the length of a period in which a write data write request from the host cannot be dealt with due to the update of the logical/physical conversion table 22 in the first RAM 32. Thus, according to the second embodiment, responsivity to the host 2 can be enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller comprising:
    a first volatile memory that temporarily stores therein data received from outside of the memory controller;
    a second volatile memory that stores therein first correspondence information representing association between a logical address of data that are transferred to a non-volatile memory and a physical address of the non-volatile memory in which the transferred data are stored; and
    a controller that controls the temporarily stored data to be transferred from the first volatile memory to the non-volatile memory, stores the first correspondence information of the transferred data into the second volatile memory, and updates second correspondence information stored in the non-volatile memory based on the first correspondence information stored in the second volatile memory by using the first volatile memory as a work area after the data is transferred from the first volatile memory to the non-volatile memory, the second correspondence information representing association between a logical address of the data that are stored in the non-volatile memory and a physical address of the non-volatile memory in which the data are stored.

2. The memory controller according to claim 1, wherein the controller controls the first volatile memory not to acquire data from outside while the controller is updating the second correspondence information stored in the non-volatile memory.

3. The memory controller according to claim 1, wherein the first volatile memory includes a first area and a second area, the first area being used for temporarily storing the data received from the outside and used for the work area, the second area being used for temporarily storing the data received from the outside, and
    the controller controls the first volatile memory to update the second correspondence information by using the first area as the work area in parallel with temporarily storing the data received from outside into the second area.

4. A memory system comprising:
    a non-volatile memory;
    a first volatile memory that temporarily stores therein data received from outside of the memory system;
    a second volatile memory that stores therein first correspondence information representing association between a logical address of data that are transferred to a non-volatile memory and a physical address of the non-volatile memory in which the transferred data are stored; and
    a controller that
        controls the temporarily stored data to be transferred from the first volatile memory to the non-volatile memory,
        stores the first correspondence information of the transferred data into the second volatile memory, and
        updates second correspondence information stored in the non-volatile memory based on the first correspondence information stored in the second volatile memory by using the first volatile memory as a work area after the data is transferred from the first volatile memory to the non-volatile memory, the second correspondence information representing association between a logical address of the data that are stored in the non-volatile memory and a physical address of the non-volatile memory in which the data are stored.

5. A memory control method of a memory system including a first volatile memory and a non-volatile memory, the method comprising:
    temporarily storing data received from outside of the memory system in the first volatile memory;
    transferring the data acquired from outside from the first volatile memory to a non-volatile memory for storage;
    storing first correspondence information of the transferred data into a second volatile memory, the first correspondence information representing association between a logical address of data that are transferred to the non-volatile memory and a physical address of the non-volatile memory in which the transferred data are stored; and
    updating second correspondence information stored in the non-volatile memory based on the first correspondence information stored in the second volatile memory by using the first volatile memory as a work area after the data is transferred from the first volatile memory to the non-volatile memory, the second correspondence information representing association between a logical address of the data that are stored in the non-volatile memory and a physical address of the non-volatile memory in which the data are stored.

6. The memory control method according to claim 5, wherein the updating includes controlling the first volatile memory not to receive data from the outside.

7. The memory control method according to claim 5, wherein the temporarily storing is performed by using a second area of the first volatile memory, and the updating is performed parallel with the temporarily storing by using a first area of the first volatile memory as the work area, wherein the first volatile memory includes the first area and the second area, the second area is used for temporarily storing data received from the outside, and the first area is used for temporarily storing data received from the outside and used as the work area.

8. The memory controller according to claim 1, wherein a first area of the first volatile memory that is used for updating the second correspondence information as the work area and a second area of the first volatile memory that is used for temporarily storing the data to be transferred to the non-volatile memory at least partially overlap with each other.

9. The memory system according to claim 4, wherein the controller controls the first volatile memory not to receive data from the outside while the controller is updating the second correspondence information.

10. The memory system according to claim 4, wherein the first volatile memory includes a first area and a second area, the first area being used for temporarily storing the data received from the outside and used as the work area, the second area being used for temporarily storing the data received from the outside, and the controller controls the first volatile memory to update the second correspondence information by using the first area as the work area in parallel with temporarily storing the data received from the outside into the second area.

11. The memory system according to claim 4, wherein a first area of the first volatile memory that is used for updating the second correspondence information as the work area and a second area of the first volatile memory that is used for temporarily storing the data to be transferred to the non-volatile memory at least partially overlap with each other.

12. The memory control method according to claim 5, wherein a first area of the first volatile memory that is used for updating the second correspondence information as the work area and a second area of the first volatile memory that is used for temporarily storing the data to be transferred to the non-volatile memory at least partially overlap with each other.

* * * * *